US012427644B2

(12) United States Patent
Chang

(10) Patent No.: US 12,427,644 B2
(45) Date of Patent: Sep. 30, 2025

(54) TOOL STORAGE DEVICE

(71) Applicant: CHUN NIEN PLASTIC LTD., Taichung (TW)

(72) Inventor: Chi-Tsai Chang, Taichung (TW)

(73) Assignee: CHUN NIEN PLASTIC LTD., Taichung (TW)

( * ) Notice: Subject to any disclaimer, the term of this patent is extended or adjusted under 35 U.S.C. 154(b) by 0 days.

(21) Appl. No.: 18/660,786

(22) Filed: May 10, 2024

(65) Prior Publication Data

US 2024/0375264 A1 Nov. 14, 2024

(30) Foreign Application Priority Data

May 12, 2023 (TW) ................................ 112204669

(51) Int. Cl.
*B25H 3/04* (2006.01)

(52) U.S. Cl.
CPC ...................................... *B25H 3/04* (2013.01)

(58) Field of Classification Search
CPC .......... B25H 3/04; B25H 3/003; B25H 3/006; B25H 3/00; B25H 3/028; B25H 3/023
USPC ....... 206/349, 372, 373, 234, 376; 211/70.6, 211/89.01, 94.01, 87.01, 60.1, 106.01, 69, 211/120, 13.1, 4; 24/561
See application file for complete search history.

(56) References Cited

U.S. PATENT DOCUMENTS 2,161,855 A * 6/1939 Copell ...................... A24F 9/14 131/241
2,639,815 A * 5/1953 Paluck ..................... B25H 3/04 211/70.6
2,707,052 A * 4/1955 Brown .................. A47L 13/512 24/561
2,805,777 A * 9/1957 Larson ..................... B25H 3/04 211/106.01
3,095,092 A * 6/1963 Magarian ................. B25H 3/04 211/89.01
3,836,058 A * 9/1974 Penniman ................. B60R 9/12 224/329
4,094,212 A * 6/1978 Hyams ................. H01H 85/547 294/131
4,597,496 A * 7/1986 Kaplan .................... B25H 3/04 211/89.01
5,071,012 A * 12/1991 Jailor .................... A47L 9/0027 D6/567
5,862,913 A * 1/1999 Chou .................... A47F 5/0823 206/378
6,095,329 A * 8/2000 Kao ....................... B65D 85/20 206/378

(Continued)

FOREIGN PATENT DOCUMENTS

TW I606903 B 12/2017

*Primary Examiner* — Anthony D Stashick
*Assistant Examiner* — Prince Pal
(74) *Attorney, Agent, or Firm* — MUNCY, GEISSLER, OLDS & LOWE, P.C.

(57) ABSTRACT

A tool storage device is provided, including: a rail base; a tool clamping seat, including a base, a clamping unit and a resilient member, the clamping unit disposed on the base, the clamping unit including a first clamping portion, a second clamping portion and a clamping space, the first clamping portion and the second clamping portion disposed on the base and spaced apart from each other; the resilient member resiliently abutted against between the connecting portion and the clamping portion.

10 Claims, 6 Drawing Sheets

(56) References Cited

U.S. PATENT DOCUMENTS 6,250,466 B1 * 6/2001 Ernst .................... B25H 3/003 206/378
6,450,338 B1 * 9/2002 Chen .................... B25H 3/003 206/378
6,564,949 B1 * 5/2003 Saathoff ................ B25H 3/006 211/94.01
6,651,855 B1 * 11/2003 Flynn .................... A45F 5/02 224/904
6,834,767 B1 * 12/2004 Lin .................... B65D 73/0007 206/349
6,932,223 B1 * 8/2005 Lee .................... B25H 3/04 206/349
7,100,777 B1 * 9/2006 Kao .................... B25H 3/04 206/464
7,669,723 B2 * 3/2010 Kao .................... B25H 3/04 206/349
7,694,832 B2 * 4/2010 Kao .................... A47F 7/0028 211/70.6
7,717,278 B2 * 5/2010 Kao .................... B25H 3/04 206/349
7,753,216 B2 * 7/2010 Kao .................... B25H 3/04 211/70.6
7,861,871 B2 * 1/2011 Kao .................... A47F 7/0028 206/349
7,882,965 B1 * 2/2011 Kao .................... B25H 3/04 248/303
7,950,534 B2 * 5/2011 Kao .................... A47F 5/0846 211/94.01
8,302,786 B2 * 11/2012 Kao .................... A47F 5/0846 211/70.6
8,317,021 B2 * 11/2012 Christopher ........... B25H 3/003 206/349
8,403,155 B1 * 3/2013 Kao .................... B25H 3/04 211/70.6
8,511,627 B2 * 8/2013 Lutze .................... H02B 1/32 248/225.11
8,777,077 B2 * 7/2014 McClain ................ A45F 5/021 224/676
9,144,306 B2 * 9/2015 Kao .................... A47B 81/00
9,205,552 B2 * 12/2015 Kao .................... F16M 13/022
9,273,803 B2 * 3/2016 Adams .................... F16L 3/127
9,597,792 B1 * 3/2017 Kao .................... B25H 3/04
9,656,385 B1 * 5/2017 Kao .................... A47F 7/0035
9,827,663 B2 * 11/2017 Kao .................... B25H 3/04
9,962,827 B2 * 5/2018 Kao .................... B25H 3/04
10,105,835 B1 * 10/2018 Kao .................... A47F 5/0853
10,228,114 B1 * 3/2019 Payton ................. F16M 13/022
11,376,725 B1 * 7/2022 Hsieh .................... B25H 3/003
D988,868 S * 6/2023 Fowler .......................... D9/456
11,685,584 B1 * 6/2023 Chen .................. B65D 73/0064 206/349
D1,044,501 S * 10/2024 Fowler .......................... D9/456
12,172,293 B2 * 12/2024 Schneider ............... B25H 3/04
12,259,087 B2 * 3/2025 Baldwin ............. F16M 13/022
2001/0008246 A1 * 7/2001 Grover ................ F16M 11/041 224/904
2005/0115853 A1 * 6/2005 Craft .................... A47L 13/512 206/349
2006/0118500 A1 * 6/2006 Chen .................... A47F 7/0028 211/70.6
2006/0254940 A1 * 11/2006 Mu ....................... B25H 3/003 206/378
2008/0023420 A1 * 1/2008 Kao ........................ B25H 3/04 211/70.6
2009/0090644 A1 * 4/2009 Kao ........................ B25H 3/04 206/373
2009/0120885 A1 * 5/2009 Kao ..................... A47F 5/0807 211/70.6
2009/0134288 A1 * 5/2009 Kao ........................ B25H 3/04 248/214
2009/0184070 A1 * 7/2009 Kao ........................ B25H 3/04 211/70.6
2010/0133213 A1 * 6/2010 Kao ..................... A47F 7/0028 211/70.6
2010/0181028 A1 * 7/2010 Chang ................ B65H 35/0073 156/510
2010/0258515 A1 * 10/2010 Chen ....................... B25H 3/04 211/70.6
2010/0300996 A1 * 12/2010 Kao ........................ B25H 3/04 211/70.6
2011/0011813 A1 * 1/2011 Kao ........................ B25H 3/04 211/70.6
2011/0056897 A1 * 3/2011 Kao ..................... A47F 7/0028 248/220.31
2011/0084039 A1 * 4/2011 Walters ................ A47F 7/0028 248/65
2011/0192810 A1 * 8/2011 Kao ...................... B25H 3/028 211/70.6
2012/0152871 A1 * 6/2012 Kao ........................ B25H 3/04 211/70.6
2012/0248051 A1 * 10/2012 Kao ........................ B25H 3/04 211/70.6
2013/0068643 A1 * 3/2013 Hsieh ...................... B25H 3/04 206/349
2013/0153521 A1 * 6/2013 Kao ........................ B25H 3/04 211/70.6
2013/0240394 A1 * 9/2013 Wang ...................... B25H 3/00 206/349
2014/0076833 A1 * 3/2014 Kao ........................ B25H 3/04 211/70.6
2015/0114862 A1 * 4/2015 Hu ..................... B65D 73/0064 206/349
2015/0165615 A1 * 6/2015 Lee ....................... B25H 3/003 206/349
2015/0190922 A1 * 7/2015 Neal ..................... A47F 5/0823 211/70.6
2015/0202767 A1 * 7/2015 Kao ..................... F16M 13/022 211/70.6
2015/0209956 A1 * 7/2015 Hu ..................... B65D 73/0064 206/349
2015/0273683 A1 * 10/2015 Ou .......................... B25H 3/04 206/349
2017/0190047 A1 * 7/2017 Kao .......................... F16B 1/00
2017/0274522 A1 * 9/2017 Kao ........................ B25H 3/04
2017/0312910 A1 * 11/2017 Kao ........................ B25H 3/04
2017/0340096 A1 * 11/2017 Aronson ................ A45C 13/30
2018/0236653 A1 * 8/2018 Kao ....................... B25H 3/006
2023/0219210 A1 * 7/2023 Chang .................... B25H 3/003 206/349
2024/0316751 A1 * 9/2024 Hurley ................... B25H 3/003
2024/0375264 A1 * 11/2024 Chang ...................... B25H 3/04
2025/0073888 A1 * 3/2025 Cacciabeve .............. B25H 3/04

* cited by examiner

TOOL STORAGE DEVICE

BACKGROUND OF THE INVENTION

Field of the Invention

The present invention relates to a tool storage device.

Description of the Prior Art

Multiple sizes of hand tools are usually required to match different sizes of driven tools. However, If the multiple sizes of hand tools are stored scattered in a toolbox, they are not easy to be found during use, and the hand tools are also easy to collide to each other and wear. Therefore, storage devices, including material racks, shelving units, etc., are developed by trader, as shown in Taiwan patent number I606903.

A conventional tool storage device typically has two sheet-shaped plates for holding a hand tool, such as screwdriver. However, the conventional tool storage device is easy to insufficient clamping force and fatigue in elasticity, leading to easy to rock or detachment of screwdrivers from the tool storage device.

The present invention is, therefore, arisen to obviate or at least mitigate the above-mentioned disadvantages.

SUMMARY OF THE INVENTION

The main object of the present invention is to provide a tool storage device, which provides a high clamping force to hold a tool between a first clamping portion and a second clamping portion.

To achieve the above and other objects, the present invention provides a tool storage device, including: a rail base, having two rail grooves; a tool clamping seat, slidably disposed on the rail base, including a base, a clamping unit and a resilient member, two opposite sides of the base having two wing portions, the two wing portions slidably engaged with the two rail grooves, the clamping unit disposed on the base, the clamping unit including a first clamping portion, a second clamping portion and a clamping space, the first clamping portion and the second clamping portion disposed on the base and spaced apart from each other, the first clamping portion including a connecting portion and a clamping portion, the connecting portion connected with the base, the clamping portion connected with the connecting portion and moved relatively to the second clamping portion, the clamping portion and the second clamping portion formed the clamping space therebetween, and the resilient member resiliently abutted against between the connecting portion and the clamping portion.

The present invention will become more obvious from the following description when taken in connection with the accompanying drawings, which show, for purpose of illustrations only, the preferred embodiment(s) in accordance with the present invention.

DETAILED DESCRIPTION OF THE PREFERRED EMBODIMENTS

Figure 1:
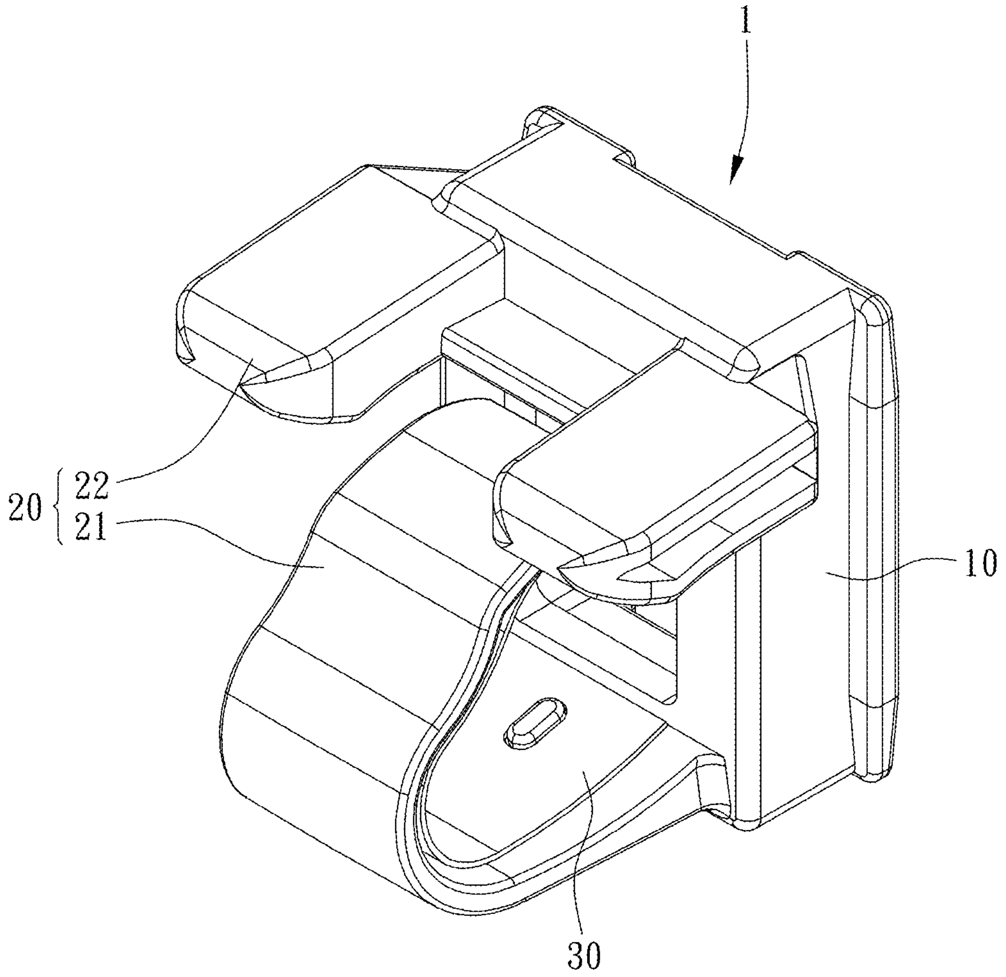
FIG. 1 is a stereogram of a preferable embodiment of the present invention.
Figure 2:
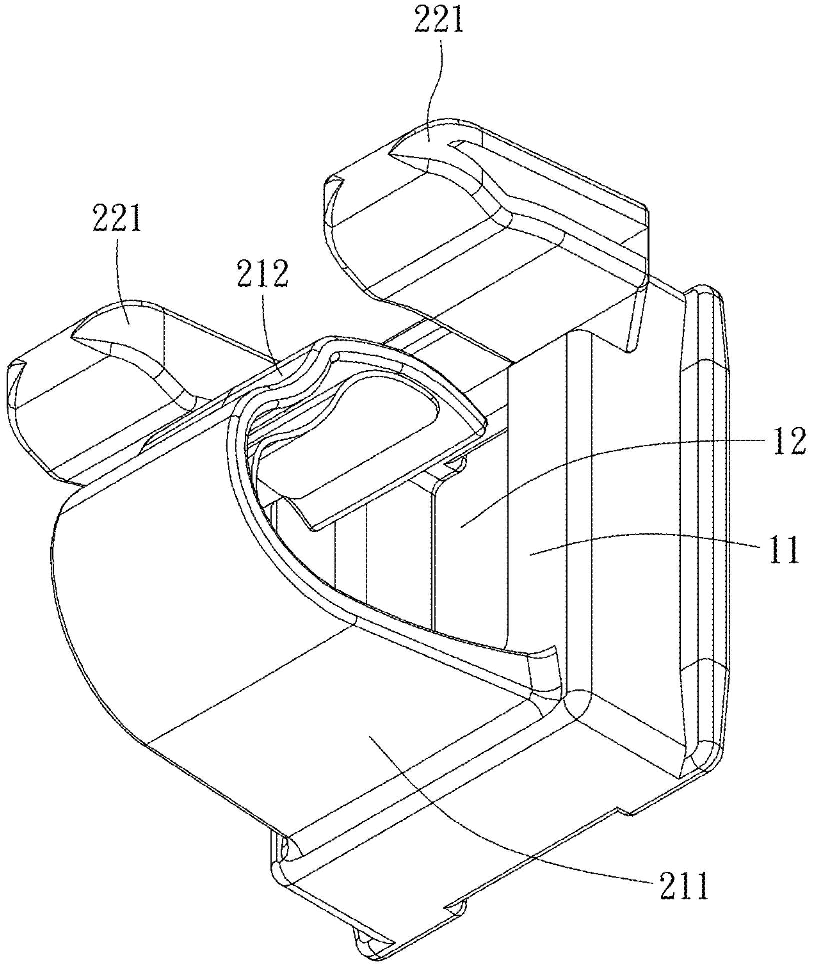
FIG. 2 is another stereogram of a preferable embodiment of the present invention.
Figure 3:
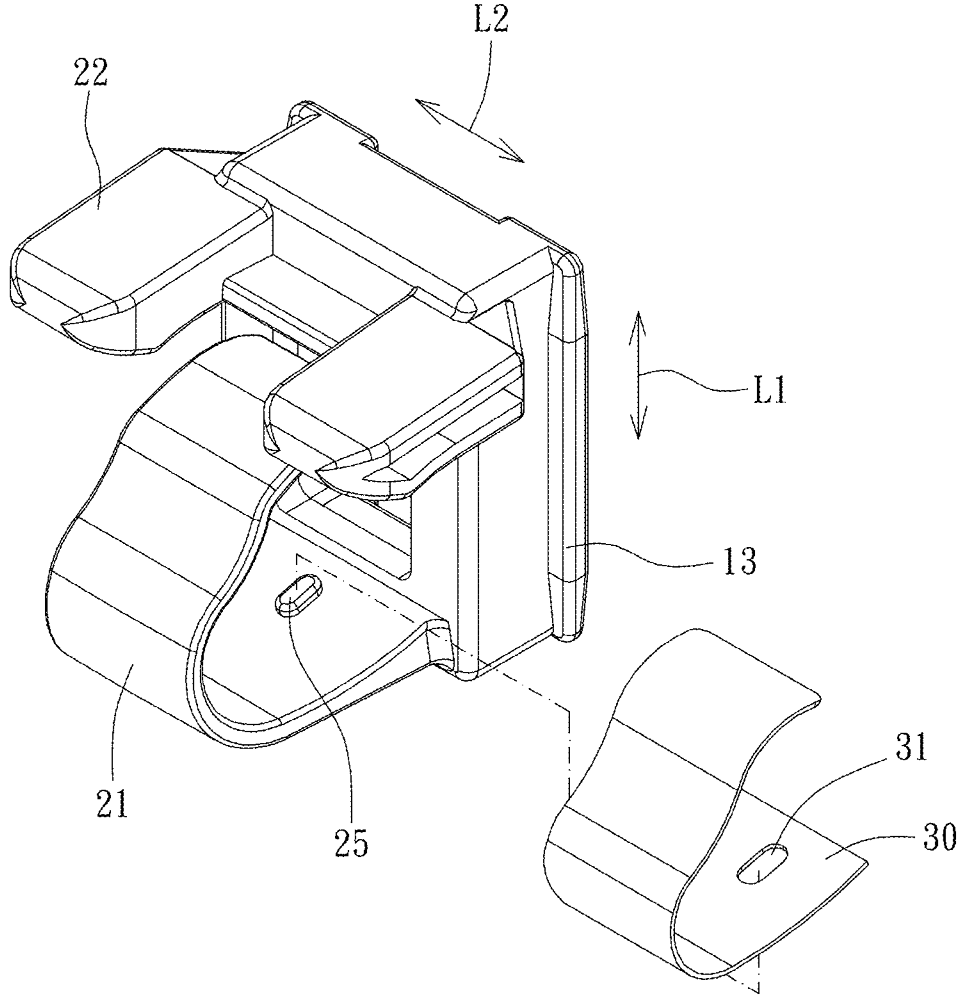
FIG. 3 is a breakdown drawing of a preferable embodiment of the present invention.
Figure 4:
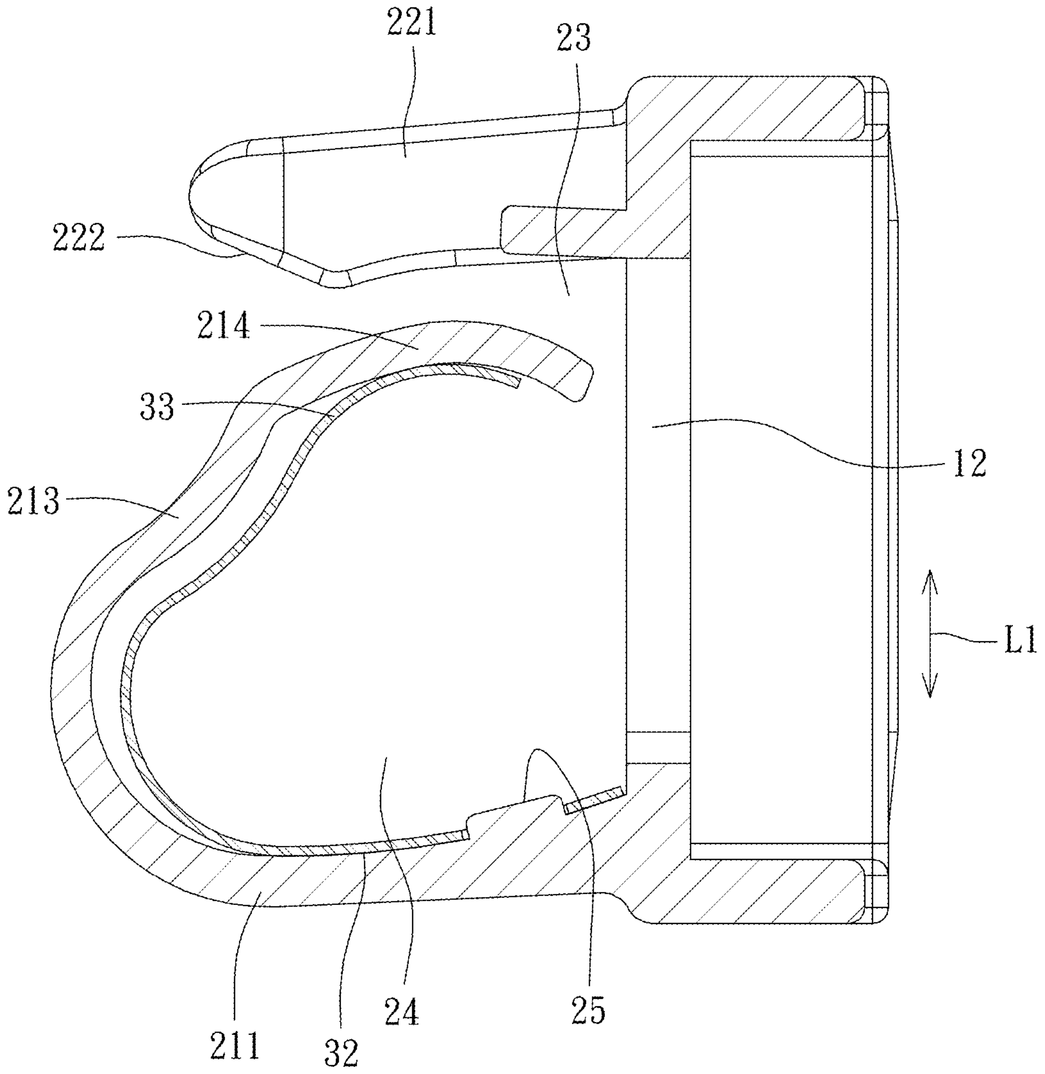
FIG. 4 is a cross-sectional view of a preferable embodiment of the present invention.
Figure 5:
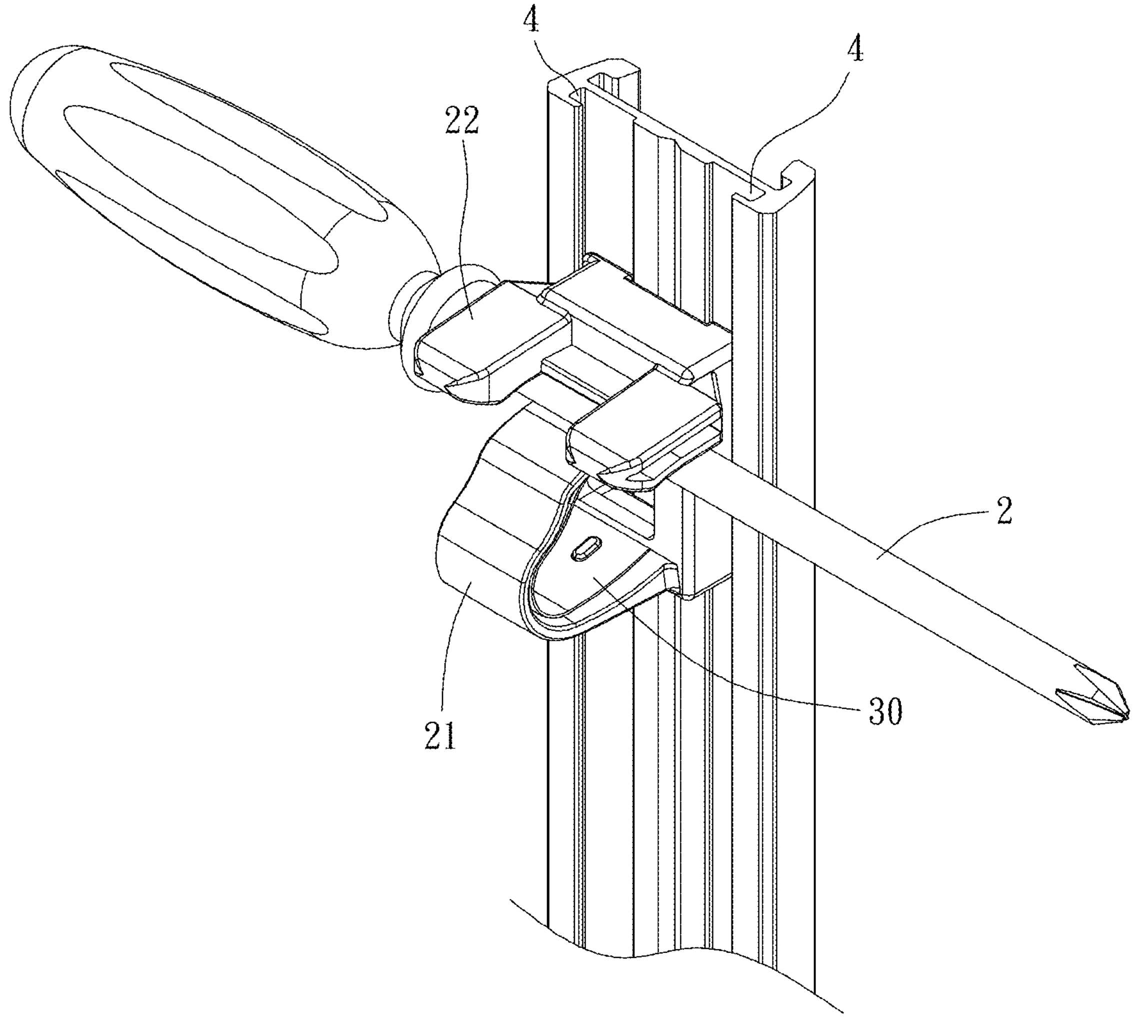
FIG. 5 is a stereogram of a preferable embodiment of the present invention in use.
Figure 6:
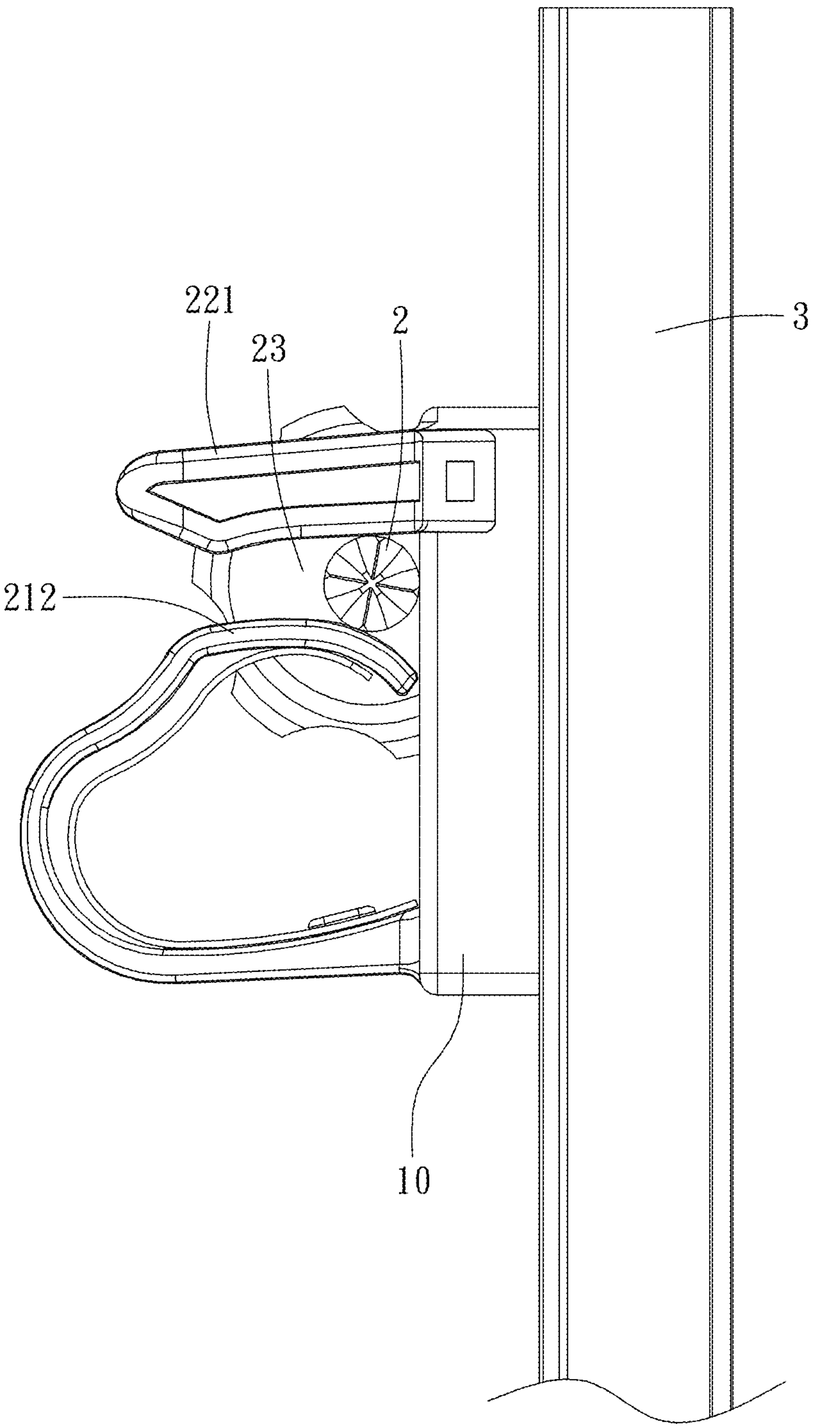
FIG. 6 is a side view drawing of a preferable embodiment of the present invention in use.

Please refer to FIGS. 1 to 6 for a preferable embodiment of the present invention. A tool storage device of the present invention includes a rail base 3 and a tool clamping seat 1. The tool clamping seat 1 includes a base 10, a clamping unit 20 and a resilient member 30.

The rail base 3 have two rail grooves 4. The tool clamping seat 1 is slidably disposed on the rail base 3. Two opposite sides of the base 10 have two wing portions 13, and the two wing portions 13 are slidably engaged with the two rail grooves 4. The clamping unit 20 is disposed on the base 10. The clamping unit 20 includes a first clamping portion 21, a second clamping portion 22 and a clamping space 23. The first clamping portion 21 and the second clamping portion 22 are disposed on the base the base 10 and spaced apart from each other. The first clamping portion 21 includes a connecting portion 211 and a clamping portion 212, the connecting portion 211 is connected with the base 10, and the clamping portion 212 is connected with the connecting portion 211 and moved (resiliently) relatively to the second clamping portion 22. Specifically, the clamping portion 212 can be moved closer to or away from the second clamping portion 22. The clamping portion 212 and the second clamping portion 22 form the clamping space 23 therebetween. The resilient member 30 is resiliently abutted against between the connecting portion 211 and the clamping portion 212. A tool 2 can be positioned within the clamping space 23 and clamped between the clamping portion 212 and the second clamping portion 22. The tool 2 can be a screwdriver, a shaft body, or another rod-shaped tool.

Therefore, the present invention provides a high clamping force because the clamping portion 212 is resiliently abutted by the resilient member 30, so that the tool 2 can be securely clamped and positioned. Furthermore, a plurality of said tool clamping seats 1 can be slid and accommodated on the rail base 3.

The base 10 and the clamping unit 20 are integrally connected with each other, resulting in a strong connection between them, and the clamping unit 20 can be elastically swung and restored relative to the base 10.

Preferably, the resilient member 30 is a metal flat leaf spring with excellent durability and high rebound force, thus providing strong resilient pushing force to the clamping portion 212. In other embodiment, the resilient member can also be made of elastic plastic material.

The connecting portion 211 and the clamping portion 212 are integrally connected with each other to form a U-shape. In this embodiment, the tool clamping seat 1 further includes a compression space 24 formed between the connecting portion 211 and the clamping portion 212, and the clamping portion 212 is movable (swayable) relative to the compression space 24; thereby, when the clamping portion 212 is pressed towards the connecting portion 211 by an external pressure such as the tool 2, the resilient member 30 provides a rebound force to move the clamping portion 212 to resiliently abut against the tool 2 disposed within the clamping space 23 to stably clamp the tool 2.

The resilient member 30 is disposed within the compression space 24. One of an inner wall of the first clamping portion 21 and the resilient member 30 has a locking protrusion 25, the other of an inner wall of the first clamping portion 21 and the resilient member 30 has a locking hole 31. The locking protrusion 25 is engaged within the locking hole 31. In this embodiment, the inner wall of the connecting portion 211 has the locking protrusion 25. The resilient member 30 includes a connecting end portion 32 and a free end portion 33. The connecting end portion 32 and the free end portion 33 are integrally connected with each other. The connecting end portion 32 has the locking hole 31, and the free end portion 33 resiliently abuts against the clamping portion 212, allowing the resilient member 30 to be stably connected with the first clamping portion 21 and not easily be detached; besides, the resilient member 30 can be quick disassembled and replaced. For example, the resilient member 30 can be replaced when its elasticity deteriorates after long-term use, or it can be replaced with varying elasticity strength based on an outer diameter size of the tool 2.

The resilient member 30 is substantially u-shaped, and a shape of the resilient member 30 corresponds to a shape formed by the connecting portion 211 and the clamping portion 212. Accordingly, the resilient member 30 has a large contact area with both the connecting portion 211 and the clamping portion 212, allowing it to stably support between the connecting portion 211 and the clamping portion 212. Therefore, when the resilient member 30 is compressed by an external forces, it is not easily shaken and can stably push the clamping portion 212. Specifically, when the tool 2 is inserted into the clamping space 23, the tool 2 laterally compresses the clamping portion 212 towards the connecting portion 211 and compresses the resilient member 30, so that the resilient member 30 provides high rebound force to clamp the tool 2 firmly.

The clamping portion 212 is substantially wavy-shaped, the clamping portion 212 includes a first curved segment 213 and a second curved segment 214, the first curved segment 213 is connected between the second curved segment 214 and the connecting portion 211, the second curved segment 214 is a free end and bends towards the connecting portion 211, and the first curved segment 213 and the second curved segment 214 bend in opposite directions. When the tool 2 is clamped between the first clamping portion 21 and the second clamping portion 22, the second curved segment 214 can easily resiliently press against the second clamping portion 22, thereby increasing the clamping force.

The base 10 defines a first direction L1 and a second direction L2, the first direction L1 is transverse to the second direction L2, the first clamping portion 21 and the second clamping portion 22 are arranged in the first direction L1, the second clamping portion 22 includes a plurality of clamping arms 221 which are spaced apart from each other in the second direction L2. Therefore, material can be saved and the overall weight can be reduced; besides, the tool 2 can be firmly clamped.

Each of the plurality of the clamping arms 221 obliquely extends towards the first clamping portion 21, allowing each of the plurality of the clamping arms 221 normally to push the tool 2 towards the first clamping portion 21, resulting in a strong clamping force. Furthermore, it is difficult for the tool 2 to detach from the clamping space 23.

A top portion of each of the plurality of the clamping arms 221 has an inclined surface 222 that faces the first clamping portion 21. Specifically, the tool 2 can move the second clamping portion 22 and the clamping portion 212 outward, and smoothly slide into the clamping space 23 by pressing against the inclined surface 22.

The base 10 has a top surface 11, the clamping unit 20 is disposed on the top surface 11, and the top surface 11 has a recess 12 which corresponds to the clamping portion 212. The recess 12 can be a blind hole or a through hole, not only to reduce the overall weight but also to prevent interference between the clamping portion 212 and the base 10 when the clamping portion 212 is moved relative to the connecting portion 211 and the second clamping portion 22. Therefore, a size of the clamping portion 212 can be designed larger to increase clamping force and clamping area.

Although particular embodiments of the invention have been described in detail for purposes of illustration, various modifications and enhancements may be made without departing from the spirit and scope of the invention. Accordingly, the invention is not to be limited except as by the appended claims.

What is claimed is:

1. A tool storage device, including:

a rail base, having two rail grooves;

a tool clamping seat, slidably disposed on the rail base, including a base, a clamping unit and a resilient member, two opposite sides of the base having two wing portions, the two wing portions slidably engaged with the two rail grooves, the clamping unit disposed on the base, the clamping unit including a first clamping portion, a second clamping portion and a clamping space, the first clamping portion and the second clamping portion disposed on the base and spaced apart from each other, the first clamping portion including a connecting portion and a clamping portion, the connecting portion connected with the base, the clamping portion connected with the connecting portion and moved relatively to the second clamping portion, the clamping portion and the second clamping portion formed the clamping space therebetween, and the resilient member resiliently abutted against and between the connecting portion and the clamping portion.

2. The tool storage device of claim 1, wherein the connecting portion and the clamping portion are integrally connected with each other to form a U-shape.

3. The tool storage device of claim 2, wherein the tool clamping seat further includes a compression space formed between the connecting portion and the clamping portion, and the clamping portion is movable relative to the compression space.

4. The tool storage device of claim 3, wherein the resilient member is disposed within the compression space.

5. The tool storage device of claim 2, wherein the resilient member is substantially u-shaped, and a shape of the resilient member corresponds to a shape formed by the connecting portion and the clamping portion.

6. The tool storage device of claim 1, wherein the base defines a first direction and a second direction, the first direction is transverse to the second direction, the first clamping portion and the second clamping portion are arranged in the first direction, and the second clamping portion includes a plurality of clamping arms which are spaced apart from each other in the second direction.

7. The tool storage device of claim 1, wherein the base has a top surface, the clamping unit is disposed on the top surface, and the top surface has a recess which corresponds to the clamping portion.

8. The tool storage device of claim 1, wherein the clamping portion is wavy-shaped, the clamping portion includes a first curved segment and a second curved segment, the first curved segment is connected between the second curved segment and the connecting portion, the second curved segment is a free end and bends towards the connecting portion, and the first curved segment and the second curved segment bend in opposite directions.

9. The tool storage device of claim 1, wherein one of an inner wall of the first clamping portion and the resilient member has a locking protrusion, the other of the inner wall of the first clamping portion and the resilient member has a locking hole, and the locking protrusion is engaged within the locking hole.

10. The tool storage device of claim 4, wherein the resilient member is substantially u-shaped, and a shape of the resilient member corresponds to a shape formed by the connecting portion and the clamping portion; the resilient member is a metal flat leaf spring; the base and the clamping unit are integrally connected with each other; the base defines a first direction and a second direction, the first direction is transverse to the second direction, the first clamping portion and the second clamping portion are arranged in the first direction, and the second clamping portion includes a plurality of clamping arms which are spaced apart from each other in the second direction; each of the plurality of clamping arms obliquely extends towards the first clamping portion; a top portion of each of the plurality of clamping arms has an inclined surface that faces the first clamping portion; the base has a top surface, the clamping unit is disposed on the top surface, the top surface has a recess which corresponds to the clamping portion; the clamping portion is substantially wavy-shaped, the clamping portion includes a first curved segment and a second curved segment, the first curved segment is connected between the second curved segment and the connecting portion, the second curved segment is a free end and bends towards the connecting portion, and the first curved segment and the second curved segment bend in opposite directions; one of an inner wall of the first clamping portion and the resilient member has a locking protrusion, the other of the inner wall of the first clamping portion and the resilient member has a locking hole, and the locking protrusion is engaged within the locking hole; and the inner wall of the connecting portion has the locking protrusion, the resilient member includes a connecting end portion and a free end portion, the connecting end portion and the free end portion are integrally connected with each other, the connecting end portion has the locking hole, and the free end portion resiliently abuts against the clamping portion.

* * * * *